US009341834B2

(12) United States Patent
Scheps

(10) Patent No.: US 9,341,834 B2
(45) Date of Patent: May 17, 2016

(54) ILLUMINATING DEVICE

(75) Inventor: Alexander Scheps, Adelebsen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 610 days.

(21) Appl. No.: 13/635,255

(22) PCT Filed: Feb. 14, 2011

(86) PCT No.: PCT/EP2011/052140
§ 371 (c)(1),
(2), (4) Date: Sep. 14, 2012

(87) PCT Pub. No.: WO2011/113652
PCT Pub. Date: Sep. 22, 2011

(65) Prior Publication Data
US 2013/0010354 A1    Jan. 10, 2013

(30) Foreign Application Priority Data

Mar. 18, 2010    (DE) .......................... 10 2010 003 036

(51) Int. Cl.
*G02B 21/06*    (2006.01)
*G02B 21/16*    (2006.01)
*G02B 21/00*    (2006.01)

(52) U.S. Cl.
CPC ............ *G02B 21/16* (2013.01); *G02B 21/0032* (2013.01); *G02B 21/06* (2013.01)

(58) Field of Classification Search
USPC ........................................................ 359/390
See application file for complete search history.

(56) References Cited

U.S. PATENT DOCUMENTS

| 2,097,250 | A | * | 10/1937 | Keith | F21V 19/04 |
| | | | | | 315/224 |
| 4,402,038 | A | * | 8/1983 | Hartung | F21V 19/04 |
| | | | | | 362/20 |
| 4,415,951 | A | * | 11/1983 | Recane | F21V 19/04 |
| | | | | | 362/20 |
| 4,855,875 | A | * | 8/1989 | Onose | F21V 19/04 |
| | | | | | 362/249.09 |
| 5,032,962 | A | | 7/1991 | Gehly et al. | |
| 6,614,030 | B2 | * | 9/2003 | Maher et al. | 250/458.1 |
| 6,838,680 | B2 | * | 1/2005 | Maher et al. | 250/458.1 |
| 6,883,952 | B2 | * | 4/2005 | Sander | 362/575 |
| 6,929,605 | B2 | * | 8/2005 | Kurosawa | A61B 1/0669 |
| | | | | | 362/574 |
| 7,114,405 | B2 | * | 10/2006 | Sunwoldt et al. | 73/866.5 |
| 7,446,936 | B2 | * | 11/2008 | Bender | 359/388 |
| 7,775,695 | B1 | * | 8/2010 | Rose | B60Q 1/0483 |
| | | | | | 362/269 |

(Continued)

FOREIGN PATENT DOCUMENTS

| DE | 202005019715 U1 | | 2/2006 | |
| DE | 202005019715 U1 | * | 3/2006 | ............. G02B 21/06 |
| GB | 904280 A | | 8/1962 | |

OTHER PUBLICATIONS

International Preliminary Report on Patentability for international application PCT/EP2011/052140, Sep. 27, 2012, 7 pages.

*Primary Examiner* — Bumsuk Won
*Assistant Examiner* — Balram Parbadia
(74) *Attorney, Agent, or Firm* — Skaar Ulbrich Macari, P.A.

(57) ABSTRACT

An illuminating device for a microscope may include a holder which carries a plurality of lighting units to be positioned in an illuminating target position. It may also include a pivot system with which the holder can be rotated about a pivot axis such that each lighting unit can be positioned selectively in the illuminating target position, wherein the rotational range of the holder about the pivot axis is less than 360°.

20 Claims, 4 Drawing Sheets

(56) References Cited

U.S. PATENT DOCUMENTS

| | | |
|---|---|---|
| 2003/0007365 A1 | 1/2003 | Sander |
| 2005/0007783 A1* | 1/2005 | Ono .............................. 362/294 |
| 2005/0176364 A1* | 8/2005 | Gehring et al. ............... 454/155 |
| 2006/0087730 A1* | 4/2006 | Bender ......................... 359/388 |
| 2006/0103923 A1* | 5/2006 | Dietrich ............... G02B 7/1805 359/385 |
| 2006/0187542 A1 | 8/2006 | Westphal et al. |
| 2008/0310017 A1 | 12/2008 | Nolte et al. |
| 2010/0002443 A1* | 1/2010 | Schultheis et al. ............ 362/282 |
| 2011/0019272 A1 | 1/2011 | Dietzsch et al. |

* cited by examiner

ILLUMINATING DEVICE

PRIORITY

This application claims the benefit of International Application PCT/EP2011/052140 filed on Feb. 14, 2011, and German Patent Application No. 102010003036.8, filed on Mar. 18, 2010, both of which are hereby incorporated herein by reference in their entirety.

FIELD

The present invention relates to an illuminating device with which one of a plurality of lighting units can be positioned selectively in an illuminating target position. Such an illuminating device can be used in particular in a microscope.

BACKGROUND

Thus, today, lighting units with high-performance LED radiation sources are used for example for fluorescence microscopy. It is often necessary to alter the wavelength irradiated into the microscope onto the preparation in order to be able to observe the preparation at different fluorescence wavelengths.

It is known from DE 103 14 125 A1 to arrange LED lighting units that emit light in different colours on a rotatable wheel. The wheel is rotated to change the wavelength. In this solution, electrical contact must be made with the LED radiation sources of the lighting units via sliding contacts in order to be able to supply the corresponding electrical energy for the lighting units.

DE 10 2008 015 720 A1 describes an illuminating device in which the LEDs are fixed and a mirror cascade is rotatable beneath the LEDs. This design is elaborate and requires a large installation space.

US 2008/0310017 A1 describes an illuminating device in which e.g. two LEDs are arranged laterally movable. This, however, requires a large installation space (because of the lateral movement) and the feed lines for the LEDs are moved a relatively long way during the changeover, which results in high wear.

SUMMARY

Starting from this, the object of the invention is to provide an illuminating system with a plurality of lighting units which can be positioned selectively in an illuminating target position, wherein the illuminating device is to be compact and durable.

According to the invention, the object is achieved by an illuminating device for a microscope, with a holder which carries a plurality of lighting units to be positioned in an illuminating target position, and a pivot system with which the holder can be rotated about a pivot axis such that each lighting unit can be positioned selectively in the illuminating target position, wherein the rotational range of the holder about the pivot axis is less than 360°.

The result of this type of pivoting for positioning the lighting units in the illuminating target position is that the necessary installation space is smaller than in the known solutions. This is advantageous in particular when the illuminating device according to the invention is housed in a stand upper part of a microscope, where the free installation space is limited.

Furthermore, the electrical feed lines can be of simple design. No sliding contacts are necessary and the movement of the feed line during the pivoting movement is minimal, whereby a long life is achieved.

In the illuminating device according to the invention, each of the lighting units can have an optical axis in each case, wherein the optical axes of the lighting units are aligned parallel to the pivot axis.

In this arrangement, the space required for the pivoting movement is advantageously small.

Furthermore, the pivot system can be formed and arranged such that gravity is used as restoring force or as additional restoring force.

In the illuminating device according to the invention, at least one of the lighting units can be exchangeably secured in the holder. The holder can have a lighting unit fixing which releasably fixes the lighting unit in the holder. In particular, the lighting unit fixing can comprise a spring which uses its elastic force to clamp the lighting unit securely in the holder. A very flexible illuminating device is thus provided in which the desired lighting units are easily exchangeable. In particular, a tool-free exchange is possible, with the result that the illuminating device can be quickly adapted to the individual requirements.

Furthermore, the illuminating device can have a locking module which fixes the holder whenever one of the lighting units is positioned in the illuminating target position. This increases the reliability of the illuminating device, as the corresponding lighting unit can be held permanently in the illuminating target position.

Furthermore, the illuminating device according to the invention can have a detection module which indicates when one of the lighting units is positioned in the illuminating target position by means of the pivot system. This can be used to supply energy to the corresponding lighting unit only when the corresponding information of the detection module has been recorded. This increases the safety of the whole device. In particular in the case of high-power sources, it can thereby be guaranteed that the corresponding lighting unit is operated only when it is also positioned in the necessary illuminating target position.

The detection module can have for example a magnet and a Hall effect sensor, wherein one of these two elements is secured to the holder and the other is arranged independently of the holder such that it does not move with the holder. Thus, for example, for each target position, a Hall effect sensor can be provided, stationary, and a permanent magnet secured to the holder. The Hall effect sensors are arranged such that in each target position the magnet is positioned in front of one of the Hall effect sensors. It can thus be easily detected which lighting unit is in the target position. Naturally, in the case of the detection module, a Hall effect sensor can also be secured on the holder and, for each lighting unit, a magnet can be arranged, stationary, such that the Hall effect sensor always emits a corresponding signal when one of the lighting units is positioned in the illuminating target position.

The holder of the illuminating device according to the invention can carry two or more lighting units. The distance of each lighting unit from the pivot axis is preferably of equal size, with the result that the positioning in the illuminating target position can be carried out by pivoting about the pivot axis.

The pivot system can rotate the holder in motor-driven manner about the pivot axis. It is thus possible to change the lighting units automatically. The lighting unit can in particular have an LED radiation source. Naturally, the lighting unit can also have further elements necessary for operation, such as e.g. a corresponding lens system.

In the illuminating device according to the invention, the wavelengths of the beams emitted by the lighting units are preferably different. However, the radiations emitted by the lighting units can also differ in different beam parameters (such as e.g. polarization).

The pivot system of the illuminating device according to the invention can have a toothed-wheel segment and a toothed rack, wherein the toothed-wheel segment is connected in rotation-resistant manner to the holder and its teeth engage with the teeth of the toothed rack, which is housed movable relative to the holder. A very precise and reproducible pivoting of the holder can thus be carried out in an economical manner.

Alternatively, it is possible for the pivot system to have a pin guided in an elongated recess and a slider mounted movable relative to the holder, wherein the elongated recess is formed either in the slider or in the holder and the pin is connected to the holder if the elongated recess is formed in the slider, and is connected to the slider if the elongated recess is formed in the holder. If the elongated recess is formed in the slider, it can be designed in particular as an elongated hole.

This formation of the pivot alignment makes possible an extremely economical pivot system, with which the desired pivoting or pendulum movement of the holder can be carried out.

A microscope with an illuminating device according to the invention is also provided. In the microscope, the illuminating device can also be designed according to the preferred embodiments. The illuminating target position of the illuminating device is preferably the position in which the beams of the corresponding lighting unit can be used to illuminate a sample to be examined with the microscope. Furthermore, the microscope can also have further elements known to a person skilled in the art which are necessary for operating the microscope.

It is understood that the features mentioned above and those yet to be explained below can be used, not only in the stated combinations, but also in other combinations or alone, without departing from the scope of the present invention.

BRIEF DESCRIPTION OF THE DRAWINGS

The invention is explained in further detail below by way of example with reference to the attached drawings which also disclose features essential to the invention. There are shown in.

DETAILED DESCRIPTION

Figure 1:
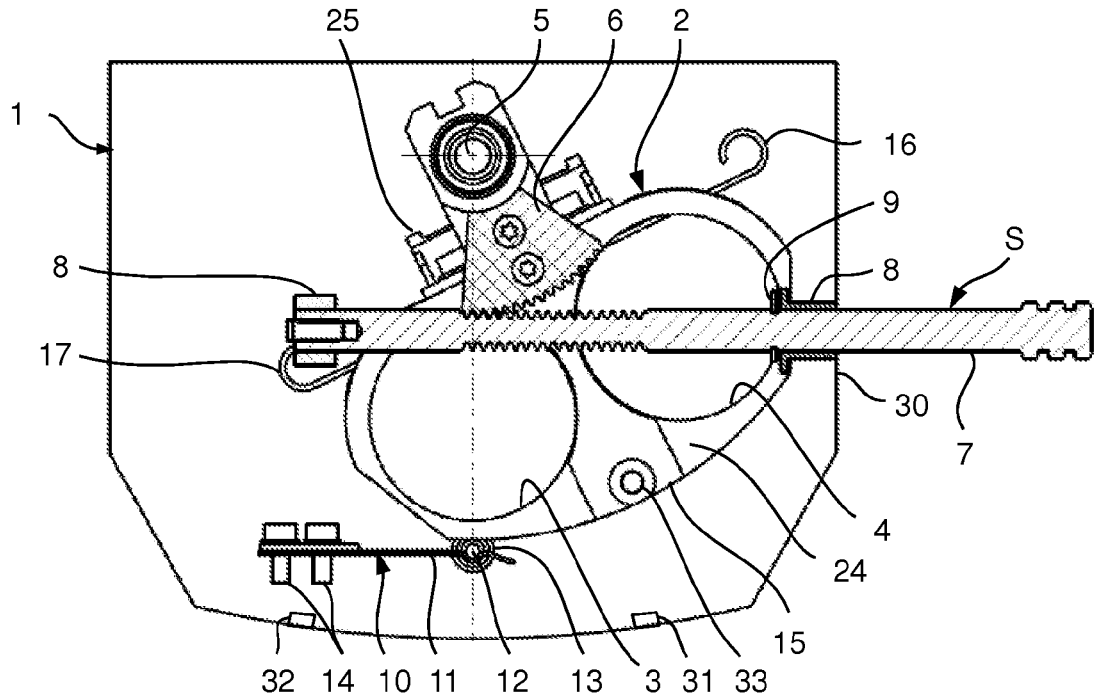
FIG. 1 a schematic top view of the illuminating device 1 according to the invention, in which the holder 2 is in a first pivot position.
Figure 2:
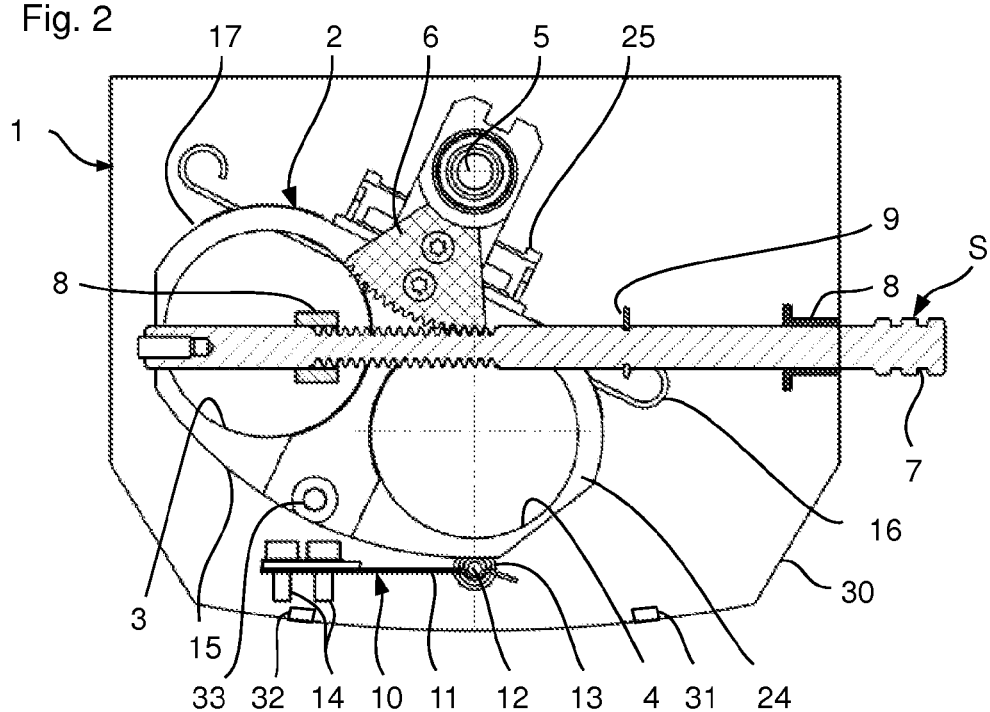
FIG. 2 a top view according to FIG. 1, wherein the holder 2 is in a second pivot position.

In the embodiment shown in FIGS. 1 and 2, the illuminating device 1 according to the invention comprises a holder 2 with two receptacles 3, 4 for receiving in each case one lighting unit (not shown) which can be formed for example as an LED module.

The holder 2 is housed pivotable about a pivot axis 5 in a housing 30, wherein a first pivot position of the holder 2 is represented in FIG. 1 and a second pivot position in FIG. 2. In the first pivot position according to FIG. 1, the lighting unit (not shown) held in the first receptacle 3 is in an illuminating target position and can be used to illuminate an object. In particular, the illuminating device 1 can be used in a microscope.

In the pivot position shown in FIG. 2, on the other hand, the second receptacle 4 is in the illuminating target position, with the result that the lighting unit (not shown) held in the second receptacle 4 can be used for illumination.

A toothed-wheel segment 6 which is connected in rotation-resistant manner to the holder 2 is provided in order to be able to pivot the holder 2 in the described manner. The teeth of the toothed-wheel segment 6 engage with the teeth of a toothed rack 7 which is housed movable in two guides 8 (from right to left and vice versa in FIGS. 1 and 2).

The holder 2 is pivoted about the pivot axis 5 by moving the toothed rack 7 from its position shown in FIG. 1 into its position shown in FIG. 2, wherein the first receptacle 3 is pivoted out of the illuminating target position and the second receptacle 4 is positioned in the illuminating target position (FIG. 2). The holder 2 thus virtually forms a pendulum which can swing back and forth about the pivot axis 5. The pivot axis 5, the toothed-wheel segment 6 and the toothed rack 7, with the guides 8, form a pivot system S for the holder 2.

As can be seen from the representations in FIGS. 1 and 2, the total or maximum pivoting range is less than 360° (no full rotation can thus be carried out). In the example described here, the pivoting range is approx. 60°.

As can furthermore be seen from FIGS. 1 and 2, the toothed rack 7 has a stop 9 which lies against the right-hand guide 8 in the pivot position shown in FIG. 1 of the holder 2.

The pivoting of the holder can be carried out by manual actuation of the toothed rack 7. But it is also possible to provide a drive for moving the toothed rack 7. A controlled positioning of the lighting units is thus possible.

Furthermore, the illuminating device has a locking module 10 which locks the holder 2 in each of the pivot positions shown in FIGS. 1 and 2. For this, the locking module 10 comprises a spring 11 to the front end of which a parallel pin 12 is secured on which a roller 13 is housed rotatable. The other end of the spring 11 is fixed locally in the housing 30, as indicated by the screws 14.

In the pivot positions shown in FIGS. 1 and 2, in each case an impression (not shown) into which the roller 13 is pushed on the basis of the elastic force, whereby the desired locking is achieved, is formed on the front side 15 of the holder. During movement or pivoting of the holder 2, the roller 13 runs out of the impression into which it just protrudes (e.g. the impression for the first receptacle 3) and along the front side 15 of the holder 2 until it engages with the impression of the other receptacle 4 (FIG. 2), with the result that the desired fixing is again achieved.

The illuminating device 1 can be formed such that the pivot positions according to FIGS. 1 and 2 are detected (for example via the position of the toothed rack 7) and then the lighting unit L1, L2 that is in the illuminating target position is supplied with energy. Naturally, any other type of detection of the pivot position is also possible.

Thus, e.g. Hall effect sensors can be used for the detection, wherein for each of the two pivot positions one Hall effect sensor 31, 32 is immovably secured to the housing 30, as indicated in FIGS. 1 and 2. It can be detected with the Hall effect sensors 31, 32 whether a magnet 33 secured to the holder is in front of the corresponding Hall effect sensor 31, 32. If this is the case, the corresponding lighting unit can be supplied with current by means of a control system (not shown), with the result that the lighting unit produces the desired illumination light.

Because the holder 2 is housed oscillating it is possible to form the illuminating device 1 very compact overall. Furthermore, no elaborate contacting is necessary, such as is necessary e.g. in the case of holders which can be fully rotated. Such a contacting has for example sliding contacts. This is advantageously not necessary in the illuminating device 1 according to the invention, as only a pendulum movement is to be carried out, thus it is only pivoted back and forth. The necessary cabling is preferably supplied close to the pivot axis 5. The illuminating device 1 according to the invention is also less expensive to produce than known slider solutions for changing the lighting units, but equally precise.

In the illuminating device 1 according to the invention, the holder 2 is formed such that the lighting units L1 are held exchangeably in the receptacles 3 and 4. For this, each receptacle 3, 4 has a spring clip 16, 17 which in each case comprises a fixing section 18, 19 and an actuating section 20, 21.

Figure 3:
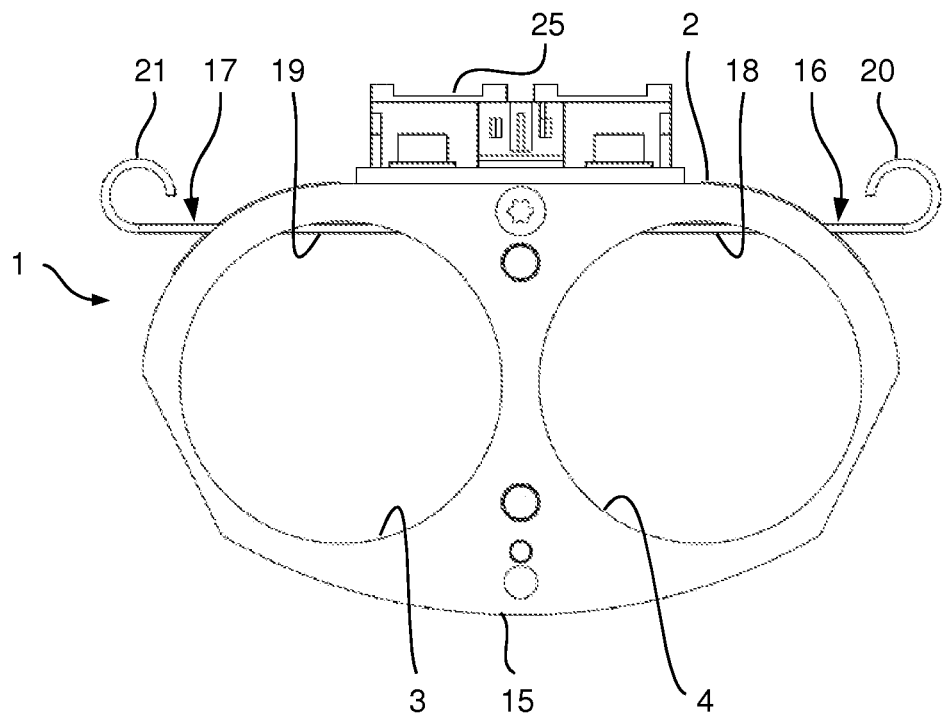
FIGS. 3 and 4 top views of the holder explaining the fixing of a lighting unit in a recess of the holder.
Figure 4:
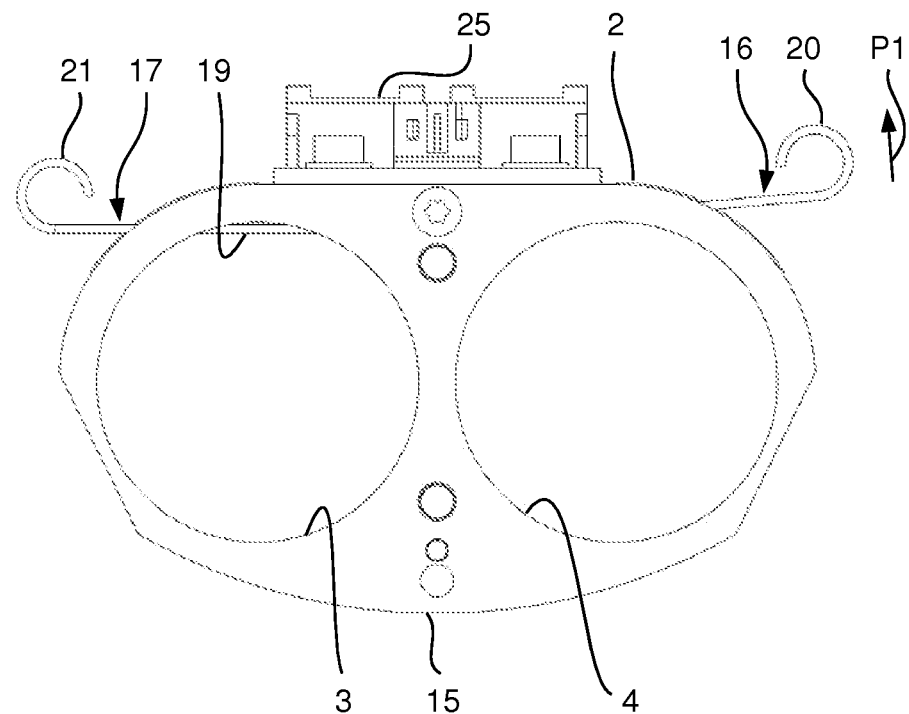

As can be seen from the representation in FIG. 3, in which the holder 2 is represented without pivot axis 5 and toothed-wheel segment 6, the fixing sections 18, 19 extend into the receiving area of the receptacles 3, 4. In order to fix a lighting unit L1 in the receptacle 3, the spring clip 16 merely needs to be pushed upwards (indicated by arrow P1 in FIG. 4), with the result that the fixing section 18 no longer protrudes into the receiving area of the receptacle 3. The lighting unit L1 can then be introduced into the receptacle 3 (as represented in FIGS. 5 to 7) and, due to the restoring force of the spring clip 16, the fixing section 18 presses against the side wall of the lighting unit L1, with the result that this is fixed in the receptacle 3.

Figure 5:
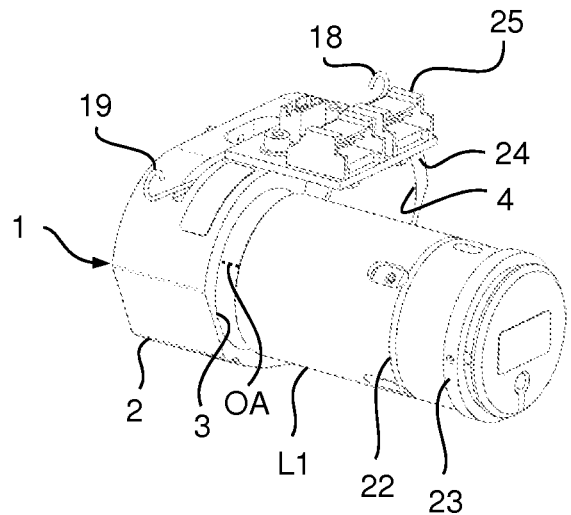
FIGS. 5-7 perspective views explaining the fixing of a lighting unit L1 in the recess 3 of the holder 2, and FIG. 8 a top view explaining an alternative design of the pivot system S.
Figure 6:
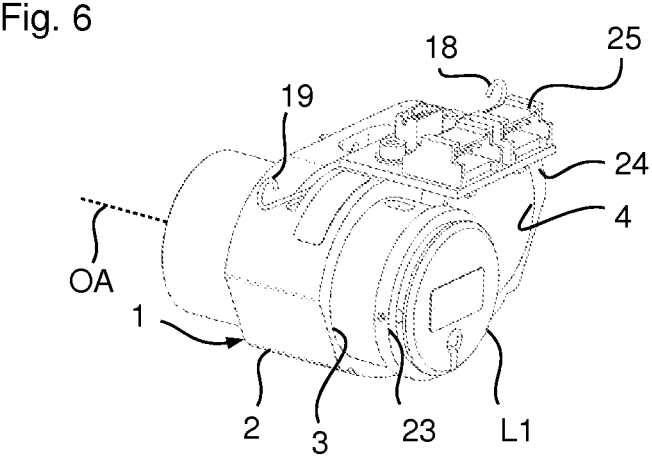
Figure 7:
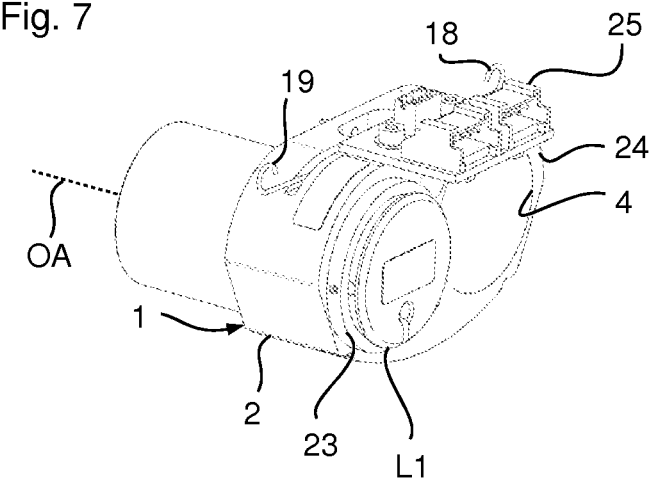

The lighting unit L1 preferably has a circumferential annular groove 22 into which the fixing section 18 engages during fixing in the receptacle 3, as represented schematically in FIGS. 5 to 7. Furthermore, the lighting unit L1 can have a stop ring 23, the external diameter of which is larger than the internal diameter of the receptacle 3. The distance between stop ring 23 and annular groove 22 is chosen such that the fixing section 18 of the spring clip 16 protrudes into the annular groove 22 when the stop ring 23 lies on the top 24 of the holder 2. In FIGS. 3 to 7, a contact section 25 is also shown which is used to supply energy to the lighting units L1. Furthermore, each lighting unit L1 has an optical axis OA.

With this type of fixing of the lighting units L1 in the holder 2, the lighting units L1 can be exchanged tool-free and thus in a user-friendly manner.

Furthermore, the illuminating device is formed such that the optical axes OA of the lighting units L1 fixed in the holder 2 are parallel to the pivot axis 5. It is thus advantageously achieved that the space to be provided for the pivoting movement can be extremely small or minimal.

Figure 8:
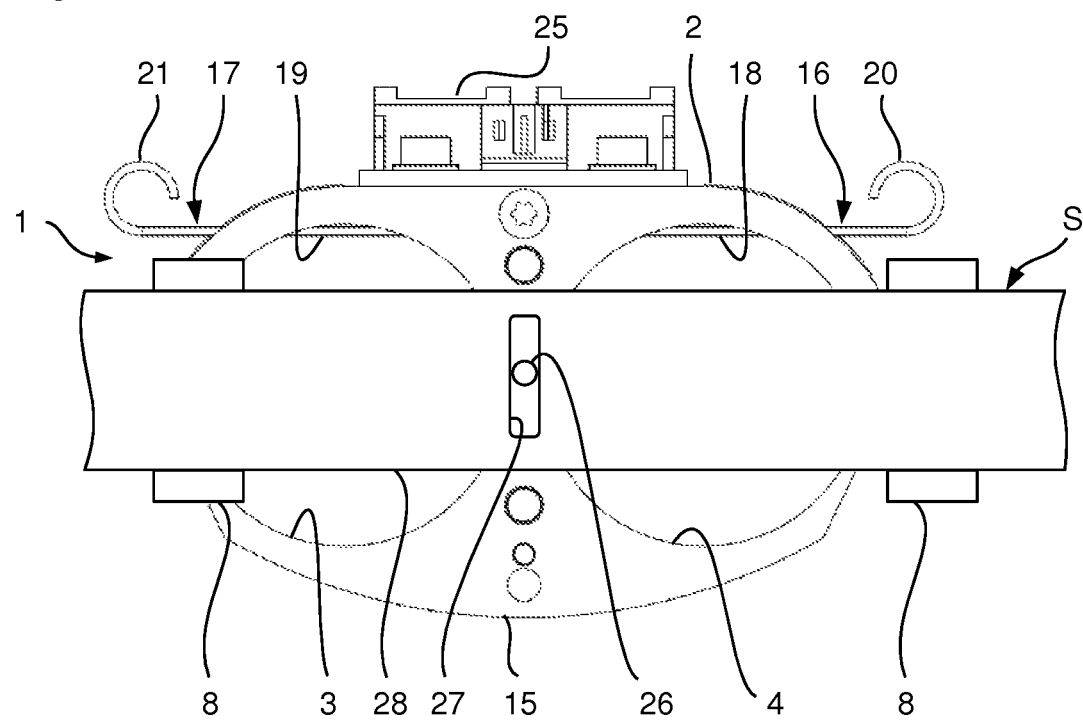

In the previously described embodiment, the pivot system S comprises the pivot axis 5, the toothed-wheel segment 6, the toothed rack 7 and the guides 8. An alternative design of the pivot system S is shown in FIG. 8. In this design, instead of the toothed-wheel segment 6 and the toothed rack 7, a pin 26 connected to the holder 2 is provided which projects upwards from the top 24 of the holder and protrudes into an elongated hole 27 of a slider 28. The slider 28 is housed movably in the two guides 8, with the result that it can be moved to the left and right in the representation of FIG. 8. The elongated hole 27 extends perpendicular to the direction of movement, with the result that when the slider 28 is moved the desired pivoting movement about the pivot axis 5 (not drawn in in FIG. 8) can be carried out. In FIG. 8, as in FIGS. 1 to 4, the lighting units L1 are not drawn in, to simplify the representation.

Naturally, the pivot system S can also be formed in any other manner in order to carry out the desired pivoting or pendulum movement of the holder 2.

In the previously described embodiments, the holder 2 has two receptacles 3, 4. Naturally, it is possible for the holder 2 to have more than two receptacles 3, 4. The distance of the centre of each receptacle 3, 4 of the holder 2 from the pivot axis 5 is preferably of equal size. In this case, only the described pivoting movement is necessary to bring the corresponding receptacle and thus the lighting unit L1 held in the receptacle into the illuminating target position.

The illuminating device 1 according to the invention can, as described, have a housing 30. The housing 30 can be formed such that it can be joined onto a housing (not shown) of a microscope, can be connected to this or can be inserted into the housing of the microscope. However, it is also possible, in the illuminating device 1 according to the invention, not to provide a housing 30, but to arrange the illuminating device 1 directly in the housing of the device for which the illuminating device 1 is designed. In particular, the illuminating device 1 can be arranged in the housing of a microscope.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illuminating device for a microscope, comprising
   a holder which carries a plurality of lighting units, each lighting unit comprising a light source, and the holder configured to be positioned in an illuminating target position; and
   a pivot system with which the holder can be rotated in a rotational range about a pivot axis such that each lighting unit can be positioned selectively in the illuminating target position,
   wherein the rotational range of the holder about the pivot axis is less than 360°, and
   wherein the pivot system includes a toothed-wheel segment and a toothed rack, each of the toothed-wheel segment and the toothed rack defining a plurality of teeth,
   wherein the toothed-wheel segment is connected in rotation-resistant manner to the holder, and
   wherein the teeth of the toothed-wheel segment engage with the teeth of the toothed rack, the toothed rack being movable relative to the holder.

2. The illuminating device according to claim 1, wherein the lighting units each have an optical axis and the optical axes of the lighting units are aligned parallel to the pivot axis.

3. The illuminating device according to claim 2, wherein at least one of the lighting units is secured exchangeably in the holder.

4. The illuminating device according to claim 3, in which the holder has a lighting unit fixing which releasably fixes the lighting unit in the holder.

5. The illuminating device according to claim 4, wherein the lighting unit fixing has a spring which uses its elastic force to clamp the lighting unit securely in the holder.

6. The illuminating device according to claim 1, wherein at least one of the lighting units is secured exchangeably in the holder.

7. The illuminating device according to claim 6, wherein the holder has a lighting unit fixing which releasably fixes the lighting unit in the holder.

8. The illuminating device according to claim 7, wherein the lighting unit fixing has a spring which uses its elastic force to clamp the lighting unit securely in the holder.

9. The illuminating device according to claim 1, wherein a locking module is provided which fixes the holder whenever one of the lighting units is positioned in the illuminating target position.

10. The illuminating device according to claim 1, wherein a detection module is provided which indicates when one of the lighting units is positioned in the illuminating target position by means of the pivot system.

11. The illuminating device according to claim 1, wherein the pivot system rotates the holder in motor-driven manner about the pivot axis.

12. The illuminating device according to claim 1, wherein the lighting unit has an LED radiation source.

13. The illuminating device according to claim 1, wherein the pivot system has a pin guided in an elongated recess and a slider housed movable relative to the holder, wherein the elongated recess is formed either in the slider or in the holder and the pin is connected to the holder if the elongated recess is formed in the slider, and is connected to the slider if the elongated recess is formed in the holder.

14. A microscope with an illuminating device, comprising:
a holder which carries a plurality of lighting units, each lighting unit comprising a light source, and the holder configured to be positioned in an illuminating target position; and
a pivot system with which the holder can be rotated in a rotational range about a pivot axis such that each lighting unit can be positioned selectively in the illuminating target position,
wherein the rotational range of the holder about the pivot axis is less than 360°, and
wherein the pivot system includes a toothed-wheel segment and a toothed rack, each of the toothed-wheel segment and the toothed rack defining a plurality of teeth,
wherein the toothed-wheel segment is connected in rotation-resistant manner to the holder, and
wherein the teeth of the toothed-wheel segment engage with the teeth of the toothed rack, and movement of the toothed rack relative to the holder causes the holder to rotate about the pivot axis.

15. The microscope according to claim 14, wherein at least one of the lighting units is secured exchangeably in the holder.

16. The microscope according to claim 15, wherein the holder has a lighting unit fixing which releasably fixes the lighting unit in the holder.

17. The microscope according to claim 14, wherein a locking module is provided which fixes the holder whenever one of the lighting units is positioned in the illuminating target position.

18. The microscope according to claim 14, wherein a detection module is provided which indicates when one of the lighting units is positioned in the illuminating target position by means of the pivot system.

19. A microscope with an illuminating device, comprising:
a holder which carries a plurality of lighting units, each lighting unit comprising a light source, and the holder configured to move the position of the light source to an illuminating target position; and
a motorized pivot system configured to rotate the holder in a rotational range about a pivot axis to selectively move each lighting unit to the illuminating target position,
wherein the rotational range of the holder about the pivot axis is less than 360°, and
wherein the pivot system includes a toothed-wheel segment and a toothed rack, each of the toothed-wheel segment and the toothed rack defining a plurality of teeth,
wherein the toothed-wheel segment is connected in rotation-resistant manner to the holder, and
wherein the teeth of the toothed-wheel segment engage with the teeth of the toothed rack, and movement of the toothed rack relative to the holder causes the holder to rotate about the pivot axis to move the position of the light source.

20. The microscope according to claim 19, wherein the light source comprises at least one light emitting diode.

* * * * *